United States Patent [19]

Parmee et al.

[11] Patent Number: 5,659,471
[45] Date of Patent: Aug. 19, 1997

[54] SECURITY SYSTEM FOR VEHICLE EQUIPPED WITH AUTOMATED MECHANICAL TRANSMISSION SYSTEM

[75] Inventors: Keith Parmee, Chorley; Keith Wright, Preston, both of England

[73] Assignee: Eaton Corporation, Cleveland, Ohio

[21] Appl. No.: 424,976

[22] Filed: Apr. 19, 1995

[30] Foreign Application Priority Data

May 14, 1994 [GB] United Kingdom ............... 9409671

[51] Int. Cl.$^6$ .................................................. B60R 25/06
[52] U.S. Cl. ............................. 364/424.045; 364/424.08; 307/10.2; 340/426
[58] Field of Search ................ 364/424.1, 424.01, 364/424.05, 424.03, 424.04, 423.098, 424.045, 424.08, 424.084, 424.085, 424.091; 340/426; 307/10.2, 10.4, 10.5

[56] References Cited

U.S. PATENT DOCUMENTS

| | | | |
|---|---|---|---|
| 3,718,202 | 2/1973 | Brock | 180/287 |
| 3,871,402 | 3/1975 | Hunt | 137/383 |
| 4,361,060 | 11/1982 | Smyth | 74/866 |
| 4,545,459 | 10/1985 | Rochman | 180/287 |
| 4,595,986 | 6/1986 | Daubenspeck et al. | 364/424.1 |
| 4,648,290 | 3/1987 | Dunkley et al. | 74/866 |
| 5,014,038 | 5/1991 | Leigh-Monstevens et al. | 340/430 |
| 5,109,729 | 5/1992 | Boardman | 74/858 |
| 5,115,145 | 5/1992 | Westberg et al. | 307/10.3 |
| 5,161,422 | 11/1992 | Suman et al. | 364/424.1 X |
| 5,179,868 | 1/1993 | Thibeault | 74/335 X |
| 5,252,861 | 10/1993 | Steeby et al. | 307/10.6 |
| 5,311,756 | 5/1994 | Villani | 70/247 |

*Primary Examiner*—Collin W. Park
*Attorney, Agent, or Firm*—Howard D. Gordon

[57] ABSTRACT

A security/antitheft system in combination with a vehicular automated transmission system (10) is provided, requiring a minimum or no additional hardware. The security system includes logic rules for the transmission system controller (38) for preventing the controller from issuing the command output signals necessary for mobilizing the vehicle in the absence of operator-initiated enabling signals and, preferably, for interpreting a predetermined sequence of manipulations of the existing selector (1) as the required enabling signals.

5 Claims, 7 Drawing Sheets

SECURITY SYSTEM FOR VEHICLE EQUIPPED WITH AUTOMATED MECHANICAL TRANSMISSION SYSTEM

BACKGROUND OF THE INVENTION

1. Related Applications

This application claims priority from GB 9409671.6 filed May 14, 1994.

This application is related to U.S. Ser. No. 08/104,699 titled SCROLLING GEAR RATIO SELECTION CONTROL SYSTEM AND METHOD, filed Aug. 11, 1993, now U.S. Pat. No. 5,416,700, and assigned to EATON CORPORATION, the assignee of this application.

2. Field of the Invention

This invention relates to security or antitheft systems for vehicles equipped with automated mechanical transmission systems by which a vehicle can be made difficult or impossible to mobilize by unauthorized individuals, even if they have access to the vehicle ignition keys or have defeated the ignition lock. In particular, this invention relates to security or antitheft systems for vehicles equipped with automated transmission systems requiring a minimum or no additional hardware devices on the vehicle.

Still more particularly, the present invention involves a vehicular security or antitheft system which utilizes the existing automated transmission controller to selectively fully or partially immobilize the vehicle without unduly adding equipment, weight or electrical complications and not depending on an added physical feature (such as a latch, lock or electrical cable) which may be destroyed, bypassed, cut or short-circuited.

DESCRIPTION OF THE PRIOR ART

Vehicular security or antitheft devices are well known in the prior art. These devices range from the use of microchip-coded ignition keys, to steering wheel locking mechanisms (such as those sold under the trademark "The Club"), to systems having an added driver input device (such as a specially configured key receiver, a card receiver, a hidden "kill switch" or a numerical key pad and one or more added disabling and/or alarm devices which will disable the vehicle and/or sound an alarm if a driver-initiated enabling input signal is not received from the input device.

While to varying degrees the prior art devices are effective to deter vehicle theft, they are not totally satisfactory, as they require costly and/or bulky added inputting or disabling hardware, they require complicated and/or expensive installations and/or they include physical devices which are subject to failure and/or defeat by the unauthorized vehicle operator.

SUMMARY OF THE INVENTION

In accordance with the present invention, the drawbacks of the prior art are minimized or overcome by the provision of an antitheft system for vehicles equipped with an automated transmission system, requiring little or no additional hardware to supply the antitheft function.

The foregoing is accomplished for a vehicle having an automated transmission system including an electronic controller for receiving input signals and for processing same in accordance with predetermined logic rules to issue command output signals to non-manually controlled system actuators by providing additional logic rules which will result in full or partial immobilization of the vehicle unless predetermined operator-initiated enabling inputs are received by the controller. The operator-initiated enabling inputs may be from an added device such as a typical antitheft system driver-input device or, preferably, from an already existing transmission system input device such as the driver-actuated shift selection device.

By way of example, assuming a vehicle equipped with an automated transmission system having a manually operated selector displaceable in a first direction to select upshifts and in a second direction to select downshifts, at vehicle start-up, the operator may be required to use the selector to enter a predetermined programmable code (such as "up-up-down-down-down-up") to enable the controller to issue the command signals necessary for mobilizing the vehicle.

Accordingly, it is an object of the present invention to provide an effective security system for vehicles equipped with automated transmission systems requiring little or no additional hardware to provide the antitheft function.

This and other objects and advantages of the present invention will become apparent from a reading of the detailed description of the preferred embodiments taken in connection with the attached drawings.

DESCRIPTION OF THE PREFERRED EMBODIMENT

Figure 1:
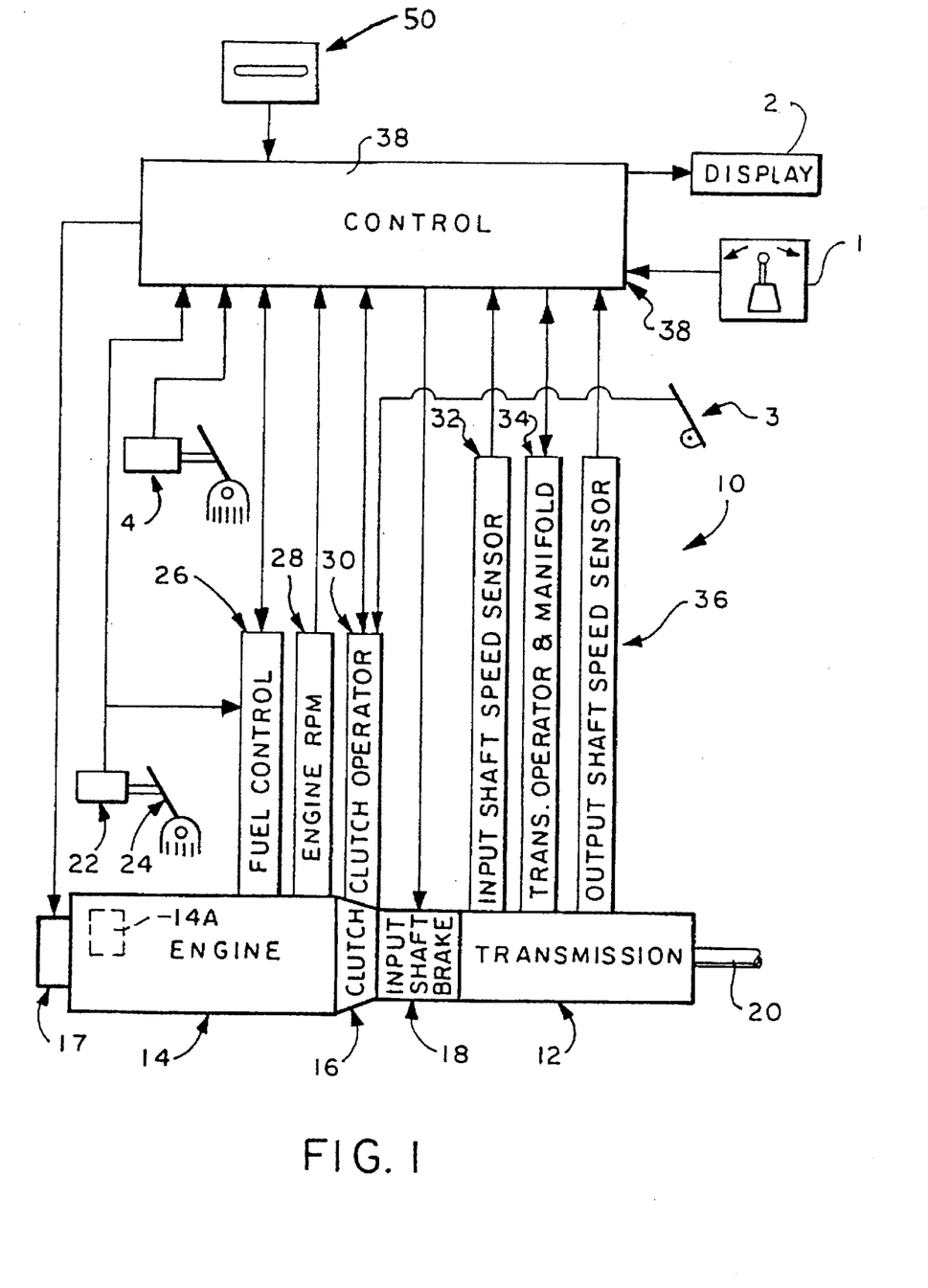
FIG. 1 is a schematic illustration of automated mechanical change-gear transmission system incorporating the antitheft system of the present invention.

A vehicular semi-automated mechanical transmission system 10 is schematically illustrated in FIG. 1. Fully and partially automated transmission systems of various types having electronic control units for receiving input signals indicative of operating parameters and/or operator requests and for processing same according to predetermined logic rules to issue command output signals to non-manually controllable actuators are known in the prior art, as may be seen by reference to U.S. Pat. Nos. 4,081,065; 4,361,060; 4,595,986; 4,646,290; 5,053,961; 4,930,078; 5,109,729; 5,261,298 and 5,335,566, the disclosures of which are incorporated herein by reference. The present invention is intended to apply to antitheft/security systems incorporated into various types of fully or partially automated transmission systems.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged.

The throttle position sensor 24 may be of the type illustrated in U.S. Pat. No. 4,922,425, the disclosure of which is incorporated by reference. Devices, such as throttle position sensor assembly 22, for sensing the operators setting of a throttle pedal 24 or the like, and providing a signal proportional to or at least indicative of the monitored setting, and so-called "remote fuel control" or "fly-by-wire" systems utilizing same, are known in the prior art and illustrated in the U.S. Pat. Nos. 4,250,845; 4,305,359; 4,319,658 and 4,461,254, the disclosures of which are incorporated herein by reference.

Figures 2, 2B, 2C:
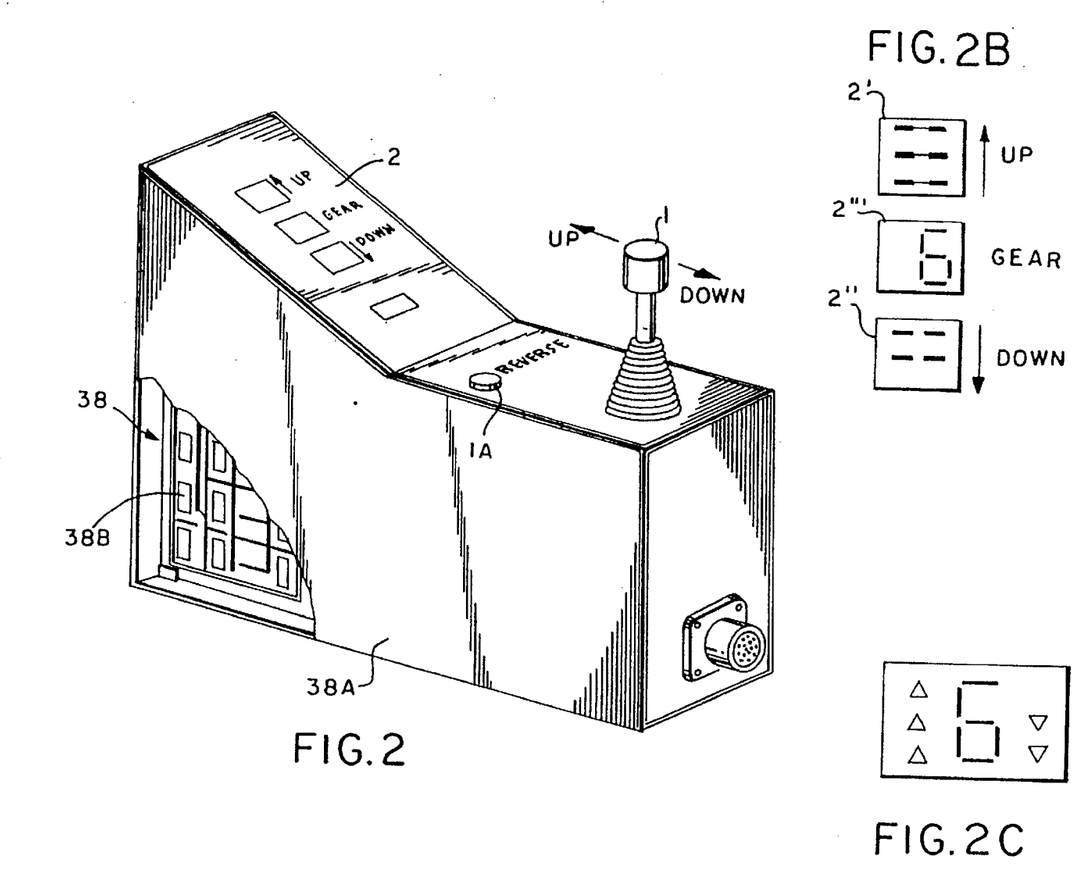
FIG. 2 is a perspective view of the driver's manual shift control and display device.
FIGS. 2B and 2C are enlarged views of a portion of the display illustrated in FIG. 2.

Control logic circuits, sensors and actuators for the transmission system 10 as disclosed in FIGS. 1 and 2, may be as disclosed in abovementioned U.S. Pat. Nos. 4,361,060; 4,648,290; 4,930,081 and 4,930,078. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to control the supply of fuel to the engine 14 to achieve rapid synchronous rotation preparatory to a shift, clutch control via operator 30, and ratio shifting via transmission operator 34. The transmission operator 34 may also be of the "X-Y" type as illustrated in U.S. Pat. Nos. 4,873,881 and 4,899,607, the disclosures of which are incorporated herein by reference.

Engine 14 may be electronically controlled, may include a dedicated controller 14A, and may communicate with ECU 38 by means of an electronic data link conforming to a protocol such as ISO 11898, SAE J1922, SAE J1939 or the like.

Although a clutch pedal 3 is illustrated for use in start-from-stop and low-speed maneuvering, the present invention also is applicable to automated transmission systems having torque converters and/or fully automated master friction clutches.

The central processing unit also sends command output signals to display 2, to be described in greater detail below. The semi-automatic transmission system 10 may additionally comprises a usual foot-operated manual clutch control 3 intended for use only for start-from-rest and/or low-speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

The central processing unit may be of the type illustrated in U.S. Pat. No. 4,595,986 and may incorporate fault detection and tolerance logic of the type illustrated in U.S. Pat. Nos. 4,849,899 ; 4,899,279 and 4,945,484, the disclosures of which are incorporated herein by reference.

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2'", the shift select lever 1, an optional reverse enable button 1A, as well as a central processing unit electronic circuitry 38B.

Referring to FIG. 2B, the display 2 includes upshift indicator section 2', downshift indicator section 2" and currently engaged gear ratio indicator section 2'". As illustrated, the currently engaged gear ratio display section 2'" is presently displaying a "6" indicating that the vehicle transmission is operating in sixth gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh, eighth or ninth speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth or to fourth gear. FIG. 2C illustrates an alternate display utilizing up/down arrows.

Briefly, the permissibility of a possible upshift or downshift is determined by comparing the expected engine speed at the completion of such an upshift or downshift, assuming a substantially constant vehicle speed or a calculated expected vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 2B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permissible and as to which upshifts and downshifts are impermissible. Should the driver not heed the warning, the central processing unit 38 will not generate an impermissible shift command, even though synchronization of the mechanical jaw clutch elements could be obtained by the system.

To shift transmission 12, the driver moves lever 1 forward (for upshifts) and rearward (for downshifts) from the position illustrated in FIGS. 2 and 3, To select a single upshift (i.e., a shift to seventh gear), the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e., seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise discretion as to when to up- or downshift, and as to how many gear ratios to up- or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38.

The reverse mode of operation may be achieved only from the neutral, at-rest position and then is achieved by moving control lever 1 backwardly from the currently engaged neutral position. To prevent an inadvertent "downshift" into reverse, a reverse button 1A may be provided, which button must be depressed prior to the central processing unit's interpreting a backward movement of the control lever 1 when in the neutral position as a request for reverse operation.

Figure 2A:
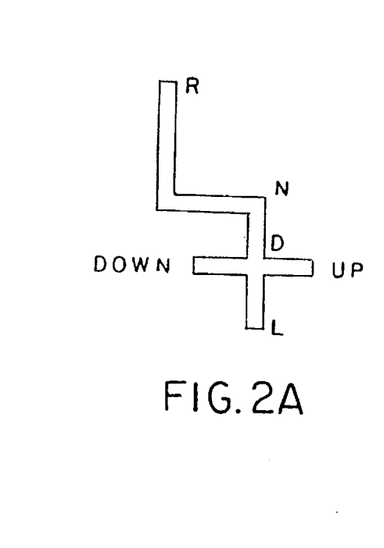
FIG. 2A is a schematic illustration of a shift selector pattern associated with a fully automated mechanical transmission system.

In an alternate control (see allowed copending U.S. Ser. No. 08/104,699, the disclosure of which is incorporated herein by reference), if the lever 1 is moved to and retained in a displaced position, the display will scroll through the allowable ratios in that direction, and will cause engagement of the ratio displayed at the time the lever is released from the displaced position thereof, It is understood, especially for more fully automated transmission systems, that a single control lever of the "P-R-N-D-L" type, movable forward and backward in a given direction to select a forward and reverse mode of operation, and then movable in a transverse direction to select upshifts and downshifts either single or multiple (of the type disclosed in U.S. Pat. No. 4,442,730, the disclosure of which is hereby incorporated by reference), may be substituted for the control lever 1 illustrated (see FIG. 2A). The selector lever 1 also may be replaced by any other type of selection device having a non-displaced position and two distinct displaced conditions, such as a rocker switch or the like.

Another advantageous feature of the semi-automatic control system of system 10 is that, whenever the vehicle is brought to a complete stop, the clutch 16 is disengaged, the transmission is engaged in a relatively high gear ratio, and the lever 1 is moved in the downshift direction once, the control will automatically shift transmission 12 to a preselected starting gear, or neutral, which may involve skip-shifting over a large plurality of intervening gear ratios. By way of example, in a 12-forward-speed transmission, the permissible starting ratios may be first through fifth gears. Once in a start ratio, a lever movement in the downshift direction will the shift the transmission one ratio lower and another movement in the upshift direction will shift the transmission one ratio higher. The operator, at rest or in motion, may always select a gear ratio from those permitted.

A single movement or pulse of the lever is a movement of the lever from the centered position to a displaced position, in either the upshift or downshift direction, and then the immediate release of the lever allowing the lever to return to the centered position thereof. If the control lever 1 is retained in the displaced position for more than a predetermined period of time (for example, for more than one or two seconds), an alternate control logic (such as a scrolling selection logic) may be utilized.

According to the present invention, a security or antitheft feature is added to system 10 by (i) providing logic rules whereby controller 38 will issue the command output signals necessary for operation of system 10 to mobilize the vehicle only upon receipt of an operator-initiated security system enabling input signal, and (ii) providing a means for the operator to input the enabling signals. Usually, the logic rules will require the driver to provide the enabling signals only during vehicle start-up, after an extended period of the vehicle's remaining stationary and/or under other predetermined conditions.

The operator-initiated enabling signals are intended to be independent of other system interlock logics, such as a battery interlock, an ignition key interlock and/or a seatbelt interlock.

To allow the operator to provide the required enabling signals, a separate inputting device (such as driver input device 50) may be provided. The add-on antitheft system input device 50, if utilized, may be a receiver for a specialized key, a receiver for an encoded card, a key pad for entering a predetermined code, a hidden switch or the like.

In a preferred embodiment, the use of an add:on input device 50 is not required and the operator provides enabling signals to the controller 38 by means of the shift lever 1 or a similar preexisting device. By way of example, the selector may be used, at start-up, to input a predetermined programmable code (such as "up-up-down-down-down-up") or to cause a predetermined sequence of numbers (such as 3-4-8-2) to appear in section 2'" of display 2.

The display 2 or other means may be utilized to prompt the operator to provide the enabling input signals.

In a further embodiment, a key or card reader 50 may be used in combination with the selector 1 to provide a 2-component enabling input signal.

As used herein, the driver-initiated security system enabling signal will refer to a signal initiated by a specific driver action, such as, for example, inserting a card, pressing a button, entering a predetermined code or the like, independent of vehicle ignition key and/or start button usage, and indicative of authorization to utilize the vehicle. The security system enabling signal is independent of usual operational enabling signals, including signals indicating insertion and rotation of the vehicle ignition key and signals indicative of conditions deemed necessary for proper functional operation of the vehicle, such as, for example, battery interlock, sensor fault detection interlock, seatbelt interlock and the like.

Alternative control logic routines for practicing the present invention are illustrated, in flow chart format, in FIGS. 3A, 3B, 3C, 3D and 3E.

In a first embodiment (see FIG. 3A), if the driver's enabling signals are not received at start-up, the controller 38 will not issue command output signals enabling engagement of any ratios.

In a second embodiment (see FIG. 3B), if vehicle motion is sensed (i.e., output shaft speed exceeds a reference), the transmission will operate in a normal manner, regardless of a lack of enabling input signals while, if the vehicle is at rest, the transmission will not engage in any ratio if the driver's enabling input signals are not received.

In another embodiment (see FIG. 3C), if driver enabling signals are not received at start-up, the controller will issue command output signals only for engaging relatively low speed ratios (such as, for example, first through fifth speeds in a 12-forward-speed transmission) if the vehicle is in motion; otherwise, all shifting will be prohibited.

Figure 3A:
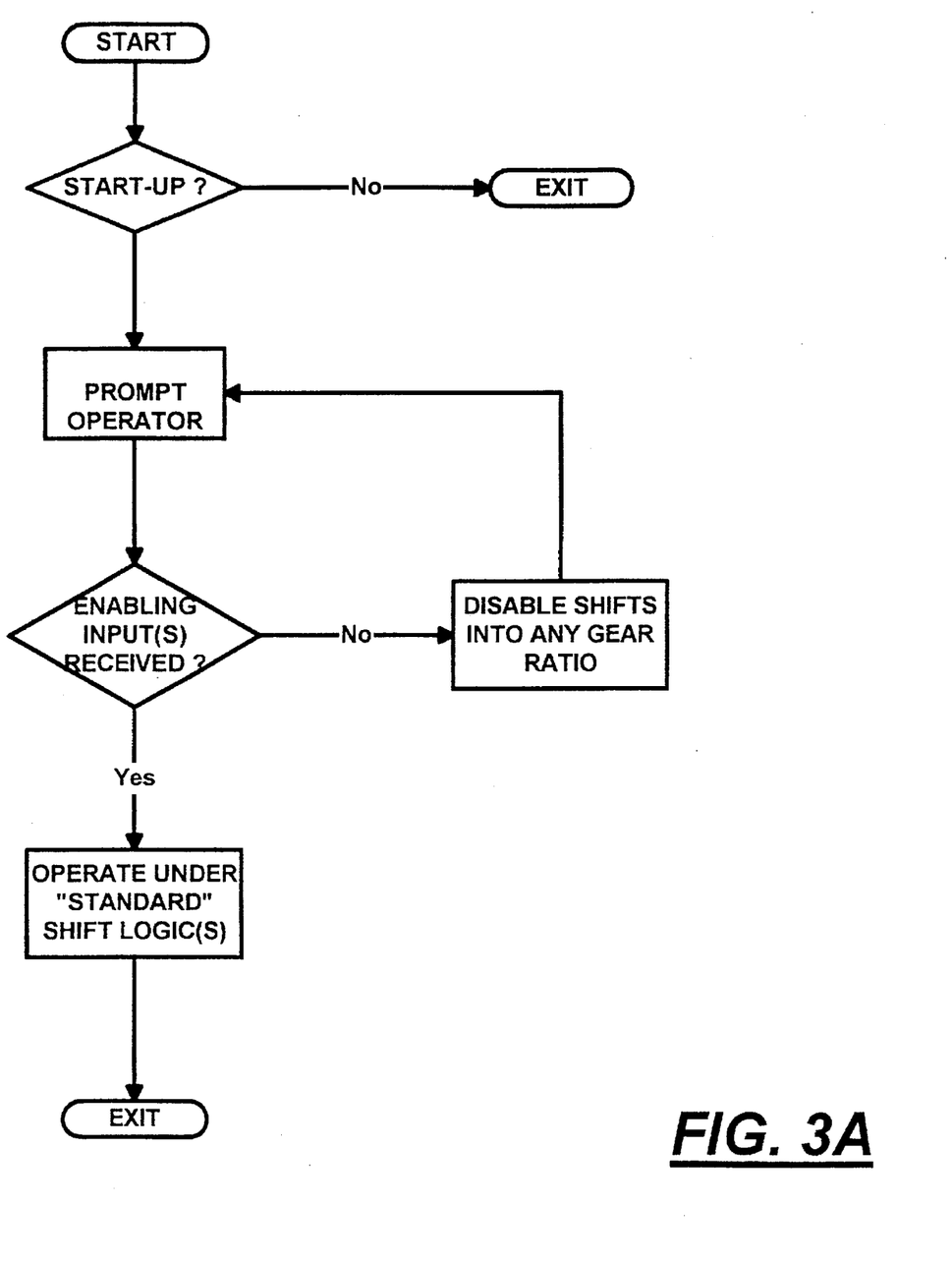
FIGS. 3A, 3B, 3C, 3D and 3E are schematic illustrations, in flow chart format, of the security system of the present invention.
Figure 3B:
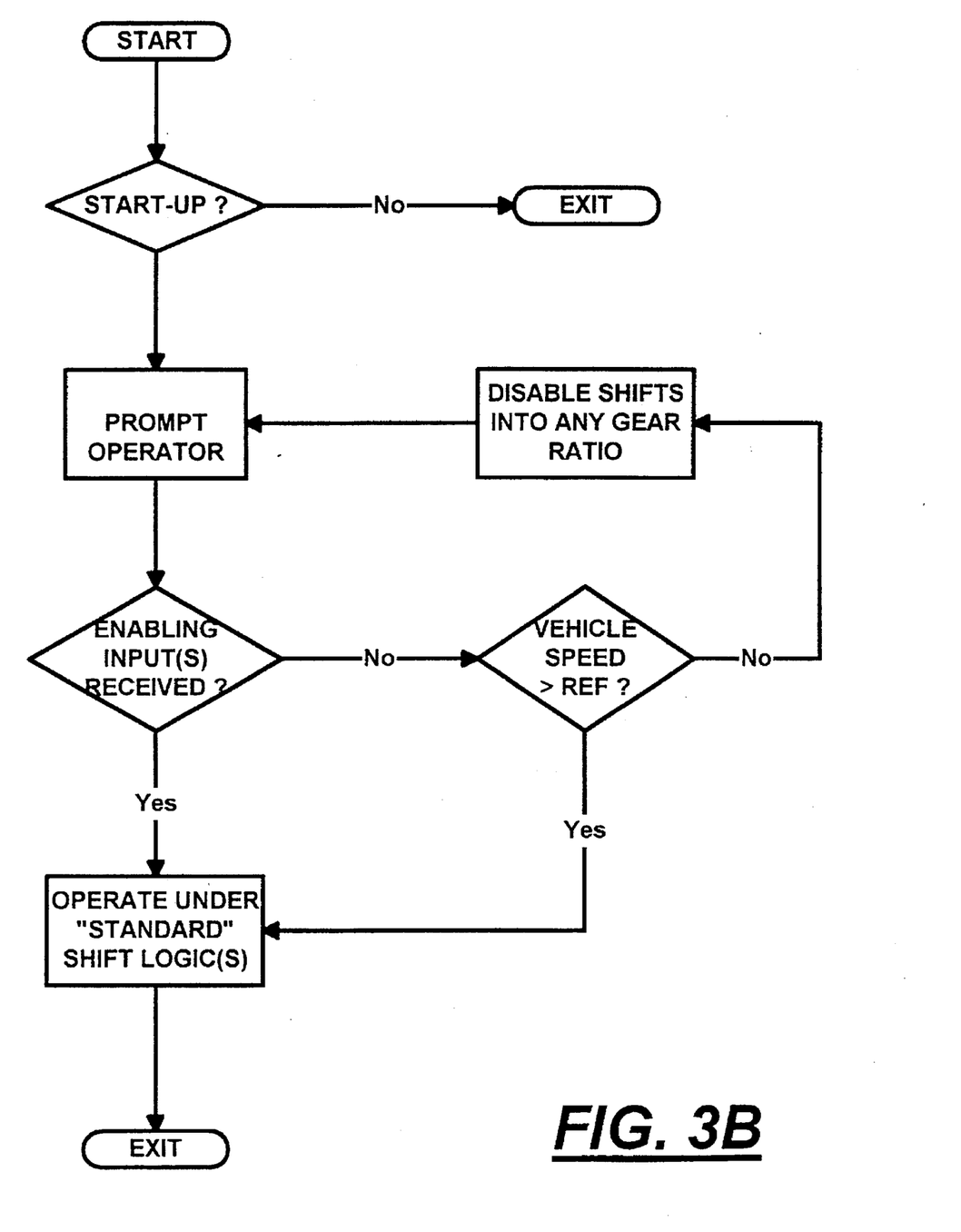
Figure 3C:
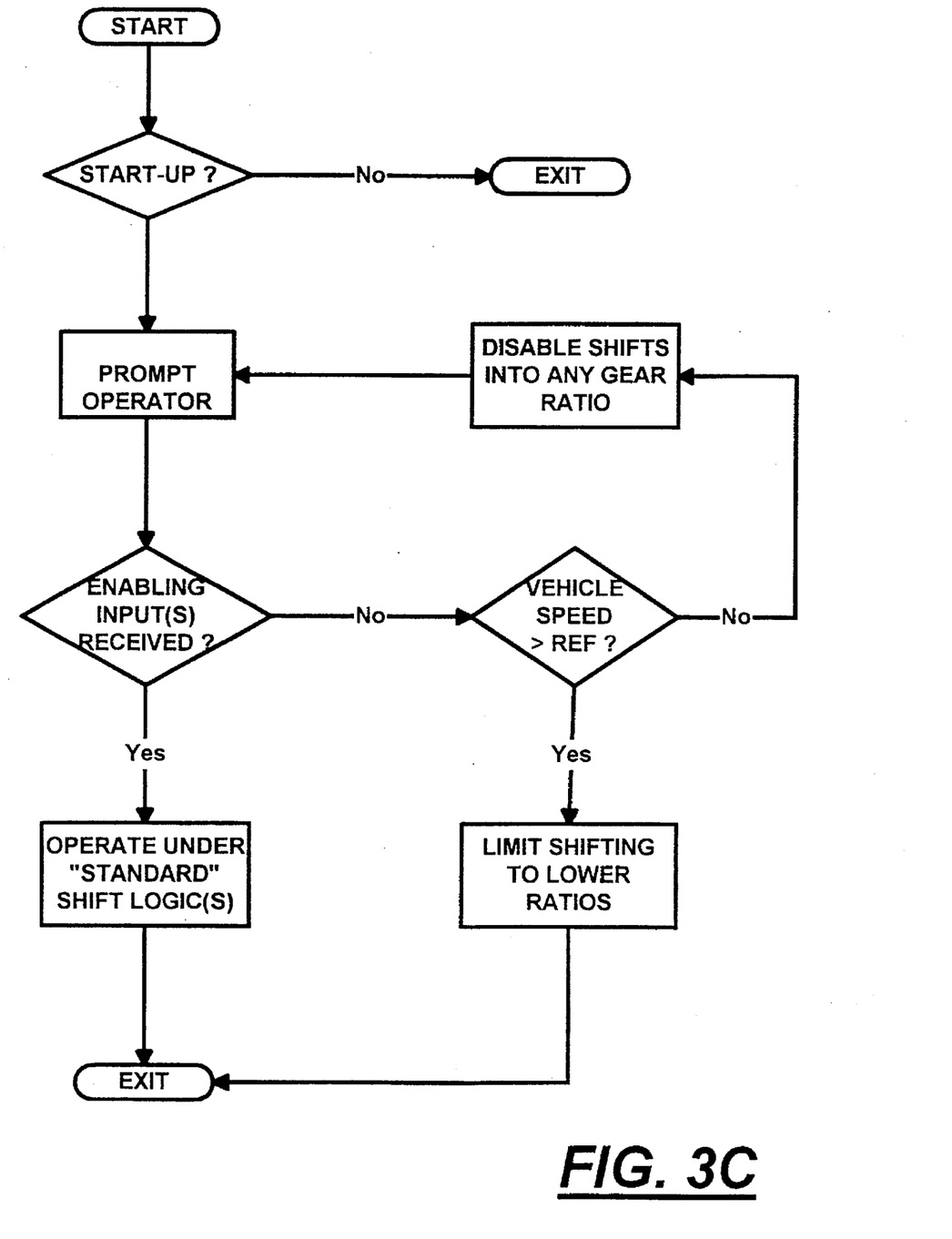
Figure 3D:
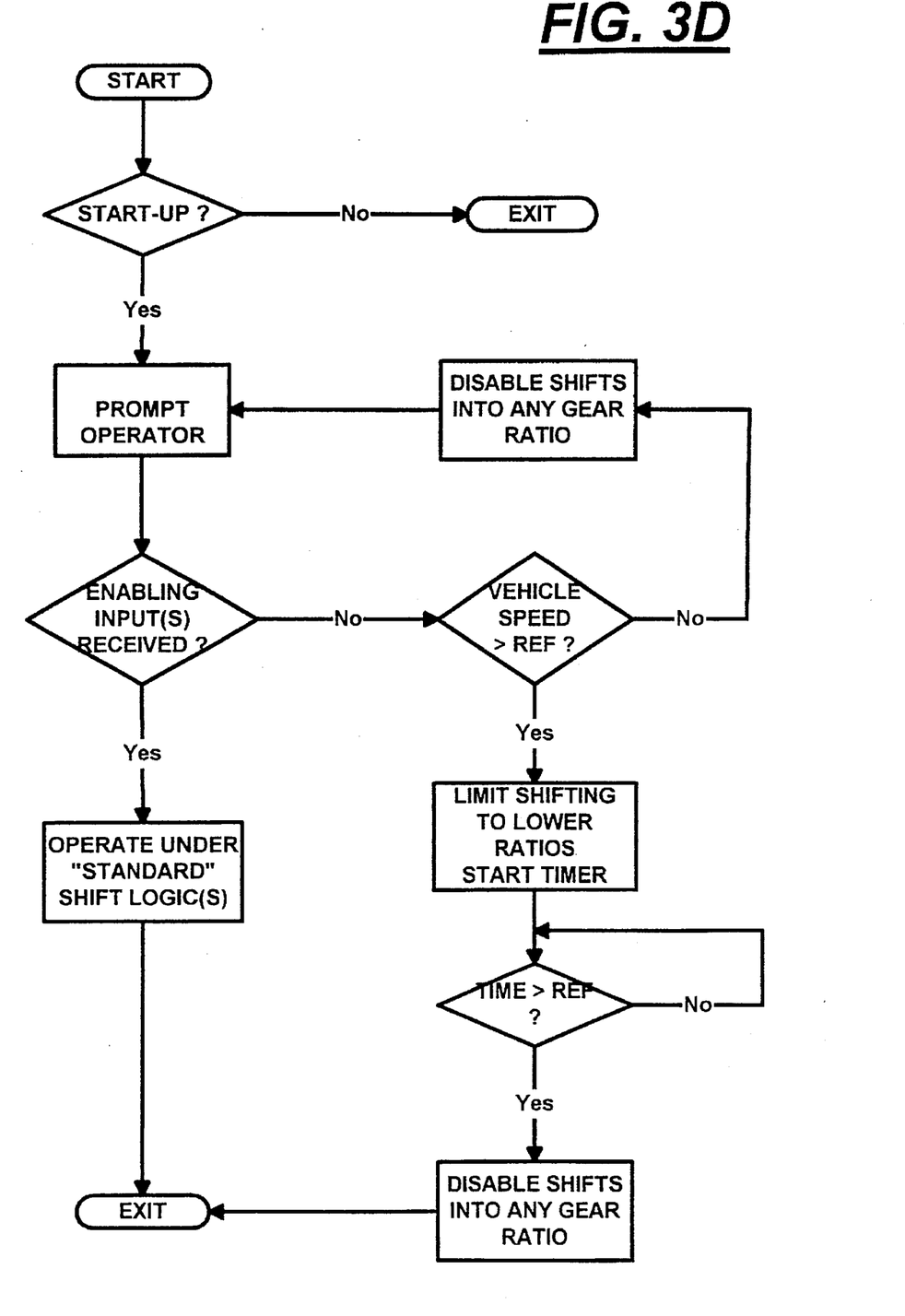
Figure 3E:
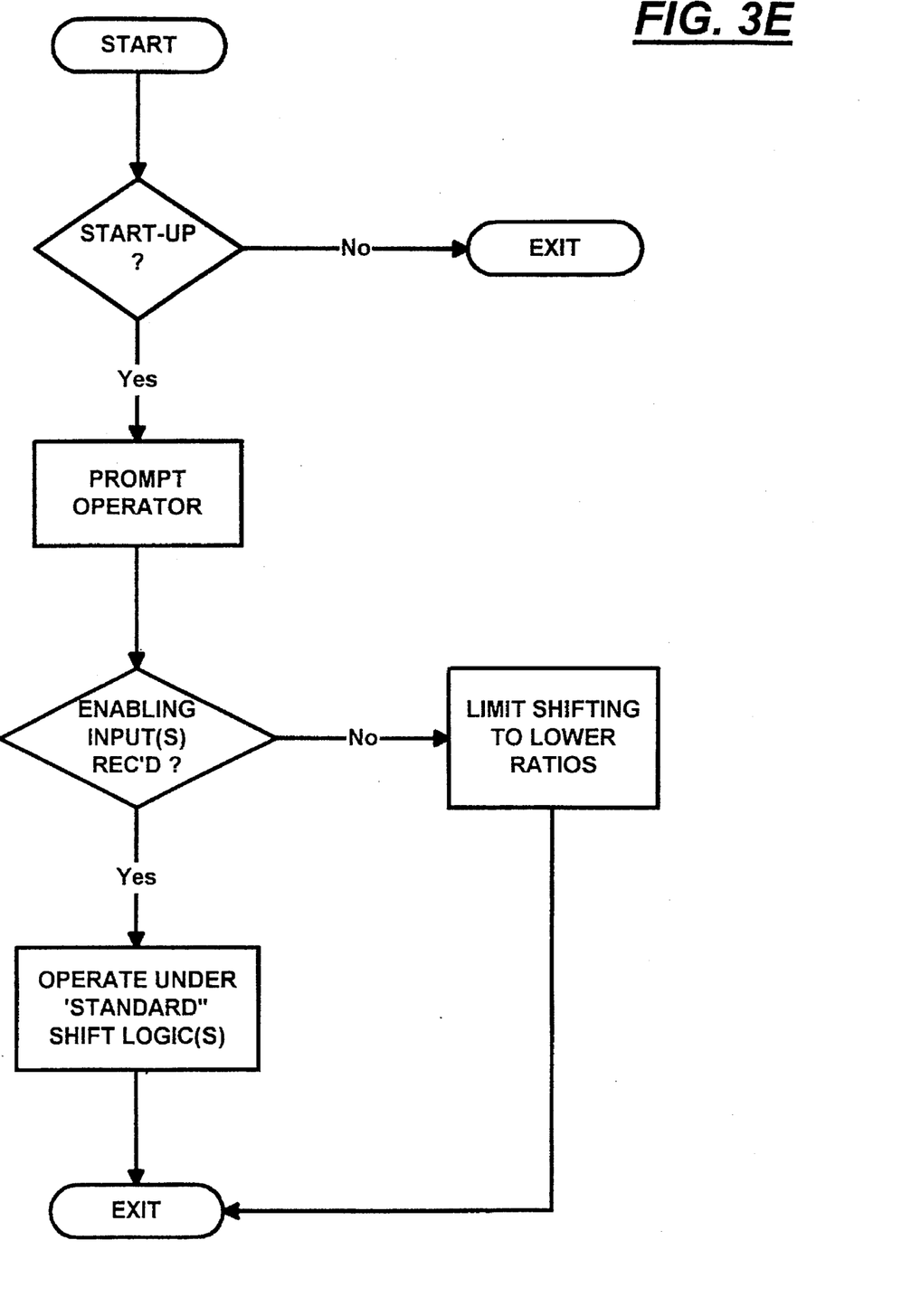

A further embodiment of the present invention is illustrated in FIG. 3D. In this embodiment (similar to that of FIG. 3C), if shifting is limited to the lower ratios due to lack of enabling signals while the vehicle is in motion, after a period of time, all shifting will be prohibited.

In yet another embodiment (see FIG. 3E), if driver enabling signals are not received at start-up, the controller will issue command output signals for engaging only the relatively low speed ratios.

Of course, in addition to or instead of fully or partially immobilizing the vehicle by limiting transmission shifting, the antitheft logic rules also may cause the controller to immobilize the vehicle by control of engine fueling and/or master clutch engagement.

Accordingly, the present invention provides an effective security/antitheft system for a vehicle equipped with an automated transmission system requiring a minimum or no additional hardware or connectors.

Although the preferred embodiment of the present invention has been described herein with a certain degree of particularity, various changes to form and detail may be made without departing from the spirit and scope of the invention as hereinafter claimed.

We claim:

1. A method of controlling a vehicular automated change-gear transmission system (10) comprising a fuel throttle control (24), a fuel throttle-controlled engine (14), a multiple-ratio transmission (12), a manually operated shift selection lever (1), a central processing unit (38) for receiving input signals and processing same according to predetermined logic rules to issue command output signals to non-manually controlled operators including a transmission operator (34), said method comprising:

predetermining a driver-initiated security system enabling input signal; and providing logic rules allowing said central processing unit to issue only command output signals required to engage low speed ratios of said transmission thus preventing said central processing unit from issuing command output signals required to engage high speed ratios of said transmission in the absence of receiving said enabling input signal.

2. The method of claim 1 wherein said enabling input signals are initiated by manipulation of said selector in a predetermined manner.

3. The method of claims 1 or 2 further comprising prompting the vehicle operator to provide said enabling input signals.

4. A security system for use in combination with a vehicular automated mechanical change-gear transmission system (10) comprising a fuel throttle control (24), a fuel throttle-controlled engine (14), a multi-speed, change-gear mechanical transmission (12), a manually operated shift selection lever (1), a central processing unit (38) for receiving input signals including a signal indicative of operation of said selection lever and for processing said input signals according to predetermined logic rules to issue command output signals to non-manually controlled operators including a transmission operator (34), said security system comprising said predetermined logic rules stored in said central processing unit for:

storing a predetermined driver-initiated security system enabling input signal reference;

interpreting a sequence of operator manipulations of said selection lever at predetermined times as a potential driver-initiated security system enabling input signal;

comparing received potential driver-initiated security system enabling signal to said reference; and if said potential driver initiated security system enabling signal is not the same as said reference, allowing said central processing unit to issue only command output signals required to engage high speed ratios of said transmission thus preventing said central processing unit from issuing command output signals required to engage high speed ratios of said transmission.

5. The system of claim 4 wherein said selection lever is displaceable in a first direction to select upshifts and in a second direction to select downshifts, said manipulations comprising movements of said lever in said first and second directions.

* * * * *